(12) United States Patent
Gaudron

(10) Patent No.: US 6,419,435 B1
(45) Date of Patent: Jul. 16, 2002

(54) WEDGING MASONRY ANCHOR BOLT AND SLEEVE ANCHOR FOR MASONRY BOLT USED IN CINDER BLOCKS

(76) Inventor: Paul Gaudron, Powers Fastners, Powers Square, New Rochelle, NY (US) 10801-4495

( * ) Notice: Subject to any disclaimer, the term of this patent is extended or adjusted under 35 U.S.C. 154(b) by 0 days.

(21) Appl. No.: 09/614,226

(22) Filed: Jul. 11, 2000

(51) Int. Cl.$^7$ .......................... F16B 35/04; F16B 39/30
(52) U.S. Cl. .................. 411/412; 411/311; 411/414
(58) Field of Search .................. 411/310, 311, 411/411, 412, 413, 414, 55

(56) References Cited

U.S. PATENT DOCUMENTS

| | | | |
|---|---|---|---|
| 2,788,046 A | * | 4/1957 | Rosan .................. 411/311 |
| 4,652,194 A | | 3/1987 | Tajima et al. |
| 5,188,496 A | | 2/1993 | Gianuzzi |
| 5,294,227 A | | 3/1994 | Forster et al. |
| RE34,969 E | | 6/1995 | Dixon et al. |
| 5,674,035 A | | 10/1997 | Hettich et al. |
| 5,800,107 A | | 9/1998 | Gianuzzi et al. |
| 5,885,041 A | | 3/1999 | Gianuzzi et al. |
| 5,957,646 A | | 9/1999 | Gianuzzi et al. |

FOREIGN PATENT DOCUMENTS

| | | |
|---|---|---|
| DE | 19503268 | 8/1996 |
| EP | 0716237 | 6/1996 |
| GB | 2130326 | 5/1984 |

\* cited by examiner

Primary Examiner—Neill Wilson
(74) Attorney, Agent, or Firm—Morgan, Lewis & Bockius LLP

(57) ABSTRACT

An enhanced strength screw-type, self-tapping masonry anchor bolt for fastening a fixture or other attachment to masonry in which a hole is drilled to receive the anchor. The anchor is provided with a shank having a root section surrounded by at least one helical male cutting thread whose crest diameter exceeds the diameter of the hole whereby when the anchor is screwed into the hole, the cutting thread then cuts a female thread in the bank of the hole to mechanically retain the anchor therein to impart to the anchor a holding power that resists axial pull-out forces. The cutting thread has a leading face that is arcuate or radial (circular) and a trailing edge that is flat and disposed essentially normal to the shank of the bolt. Also provided is a masonry anchor for use with thin-walled masonry articles such as cinder blocks which is essentially a sleeve of a durable polymeric material.

9 Claims, 2 Drawing Sheets

US 6,419,435 B1

WEDGING MASONRY ANCHOR BOLT AND SLEEVE ANCHOR FOR MASONRY BOLT USED IN CINDER BLOCKS

BACKGROUND OF INVENTION

1. Field of Invention

This invention relates generally to screw-type masonry anchors for fastening an attachment to masonry, the anchor being turned into a hole drilled in the masonry to mechanically retain the anchor therein, and more particularly to an anchor of this type having one or more cutting threads which enhance the holding power of the anchor. This invention also relates to a sleeve anchor for use when such masonry bolts are used with cinder blocks or other masonry having thin-walled areas.

2. Status of Prior Art

In order to fasten fixtures and other attachments to masonry, it is known for this purpose to use a screw-type anchor, such as the anchors disclosed in the Giannuzzi U.S. Pat. Nos. 5,118,496 and 5,282,708. In anchors of this type, a helical cutting thread is formed on the shank of the anchor which acts to cut and tap the bank of a hole drilled in the masonry when the anchor is turned into this hole; thereby mechanically retaining the anchor therein. The resistance of this anchor to axial pull-out forces represents its holding power.

The term masonry is generic to all stone-like building materials, such as concrete and brick. As pointed out in British patent application GB 2115511 A to Godsted, when masonry is exceptionally hard, such as masonry whose aggregate is formed of granite, then in order to turn a screw-type masonry anchor into a hole drilled therein, the torque required for this purpose is very high. The torque is so high, in fact, that when seeking to screw an anchor into the masonry hole, the anchor could then break.

To create an anchor capable of being screwed into a hole drilled in exceptionally hard masonry, Godsted's anchor is provided with a helical thread having a V-shaped cross sectional configuration in which the flanks of the thread intersect at an included angle of 50 to 65 degrees.

The screw-type masonry anchor disclosed in the Ernst U.S. Pat No. 3,937,119 has a sharp-crested helical thread in which notches are formed in the crests of the thread to facilitate embedment of the crests in the bank of the drilled masonry hole. Aggregate particles cut from the bank of the masonry hole by the notches in the crest are collected in a reservoir in the space between successive convolutions of the thread. According to Ernst, because the particles are collected, they do not produce torsional friction and make it possible to turn the anchor into the hole at relatively low torque levels. Also according to Ernst, the retention of these particles in the reservoirs "would enhance the pull out force of the anchor." But Ernst does not explain how loose particles in this reservoir act to enhance the resistance of the anchor to axial pull out forces.

Bickford, in U.S. Pat No. 5,531,553, discloses a self-tapping masonry anchor having a helical cutting thread surrounding the shank of the anchor. This cutting thread is formed by a pair of parallel helical ridges having a depressed groove therebetween serving to collect substrate debris removed by the cutting action. To facilitate self-tapping, the helical and separating the successive convolutions of the parallel ridges has a width measured axially with respect to the shank of at least 4 mm and at least 50% of the land shank diameter. The helix angle of the helical ridge in Bickford is at least 10%. In Bickford, even if particulate debris collected in the groove in the helical cutting thread were compacted therein, it would only serve to resist displacement of the helical thread with respect to the corresponding female thread cut into the bank of the hole; but it would not serve to significantly enhance the holding power of the anchor. Also in Bickford whose cutting thread has two parallel ridges, these ridges are in close proximity to each other, with a broad land between successive convolutions of the thread. The propinquity of the ridges does not allow each individual ridge to utilize the maximum shear strength available in the masonry material.

Of potentially greater interest is Tajima, U.S. Pat. No. 4,652,194, in which particulate debris produced by the cutting action of a screw-type anchor serves to enhance the holding power of the anchor. Tajima points out that prior to his invention it was known to exploit the space between successive convolutions of the thread to collect and compact therein debris produced by the cutting thread to increase the pull-out resistance of the anchor. According to Tajima, the spaces in prior art anchors were unduly large and it was therefore not possible for these spaces between successive convolution to be completely filled up and tightly compacted with particles to wedge the anchor in the hole. To overcome this drawback, Tajima provides a triangular indentation in the land between successive convolutions of his helical thread. This indentation is filled with particles scraped off the bank of the masonry hole by the cutting action of the thread. However, an indented land creates a relatively large space and the particles in the space may not become tightly compacted to wedge the anchor in the hole.

In Giannuzzi et al., U.S. Pat. No. 5,957,646, an anchor is provided with a shank having a root section surrounded by at least one helical male cutting thread whose crest diameter exceeds the diameter of the hole whereby when the anchor is screwed into the hole, the cutting thread then cuts a female thread in the bank of the hole to mechanically retain the anchor therein to impart to the anchor a holding power that resists axial pull-out forces. Formed on the root in the helical land between successive convolutions of the thread is a ridge that is raised above the root to define a compacting zone between the ridge and the bank of the hole. Particulate debris produced by the cutting action is discharged into the land and forced into the compacting zone to create a dense mass that wedges the anchor in the hole and thereby enhances the holding power of the anchor.

While these are all innovative designs, it would be beneficial to provide a bolt having both additional wedging action as well as additional holding action.

In another aspect, none of these devices is directed to the problem of using a masonry bolt on a cinder block or other hollow or thin-walled ceramic or masonry block. Such blocks typically have a thin wall of a thickness less than the length of any masonry bolt to be inserted. Thus, when a hole is drilled and a masonry bolt inserted, the bolt does not grab the wall well and even if it cannot be pulled out, usually it can be unscrewed from the wall with very little backout torque (e.g., if Giannuzzi's bolt is unscrewed ¼ turn with a wrench, it can thereafter be unscrewed with one's fingers, similar to a wood screw).

SUMMARY OF INVENTION

In view of the foregoing, one object of this invention is to provide a self-tapping, screw-type anchor for fastening an attachment to masonry, the anchor being screwed into a hole drilled in the masonry and being mechanically retained therein to resist both pull-out and unscrewing forces, the holding strength and resistance to pull-out and unscrewing being enhanced by compacted particulate debris that creates a mass that wedges the anchor in the hole.

More particularly, an object of this invention is to provide an anchor of the above type in which the anchor is mechanically retained in the hole by multiple lead male cutting threads surrounding the shank of the anchor which are separated from a nub by low-lying lands, and in which particulate debris produced by the cutting threads is compacted by the nub to create a dense mass that wedges the anchor in the hole.

Briefly stated, these objects are attained by a screw-type, self-tapping masonry anchor for fastening a fixture or other attachment to masonry in which a hole is drilled to receive the anchor. The anchor is provided with a shank having a root section surrounded by one or two helical male cutting threads whose crest diameters exceed the diameter of the hole whereby when the anchor is screwed into the hole, the cutting threads then cut corresponding female threads into the bank of the hole to mechanically retain the anchor therein to impart to the anchor a holding strength that resist axial pull-out forces. The threads in cross section have a trailing face that is essentially normal to the shank and a leading face that is essentially radial in geometry. Formed on the root in the helical land between successive convolutions of the thread is a hemispherical ridge that is raised above the root of the thread and provides a diameter larger than the hole into which the anchor is inserted but less than the diameter of the crest of the cutting threads.

In summary, this invention provides a screw-type self-tapping masonry anchor bolt for fastening an attachment to friable masonry having a hole drilled therein to receive the bolt, the hole having a predetermined diameter, the bolt comprising a shank having a root section whose diameter is smaller than that of the hole and a shank being integral with a head adapted to be engaged by a torque-producing tool, at least one helical male cutting thread surrounding the root and having a crest diameter exceeding that of the hole whereby when the head is engaged by the tool and the bolt is screwed into the hole the male cutting thread then-cuts a female thread into the bank of the hole to mechanically retain the anchor and resist pull-out forces to impart holding strength to the anchor, the convolutions of the thread having a helical land or space therebetween being less than the predetermined diameter, and a hemispherical ridge formed in the helical land or space and having a diameter greater than the predetermined diameter and less than that of the crest diameter effective to wedge into the bank of the hole.

While not desirous of being constrained to any particular operating principle, it is believed that the cutting tooth acts to oppose pull-out forces, while the ridge provides a wedging action along its entire helical extent the opposes unscrewing forces. The helical nature of the cutting thread provides a mechanical advance allowing the frictional forces of the wedging ridge to be overcome when inserting the bolt by screwing.

Another object of this invention is to provide a device and method for using such an anchor in a cinder block or other thin-walled masonry block, and especially to prevent such an anchor from being unscrewed therefrom.

In summary, this invention provides a sleeve used for inserting a masonry anchor into a hole having a predetermined diameter in a thin-walled masonry block, the sleeve comprising a deformable polymeric material having an inner diameter approximately equal to the diameter of root of the masonry anchor and an outer diameter approximately equal to the predetermined diameter of the hole.

BRIEF DESCRIPTION OF DRAWINGS

For a better understanding of the invention, as well as other objects and further features thereof, reference is made to the following detailed description to be read in conjunction with the accompanying drawing, wherein.

DESCRIPTION OF INVENTION

Figure 1:
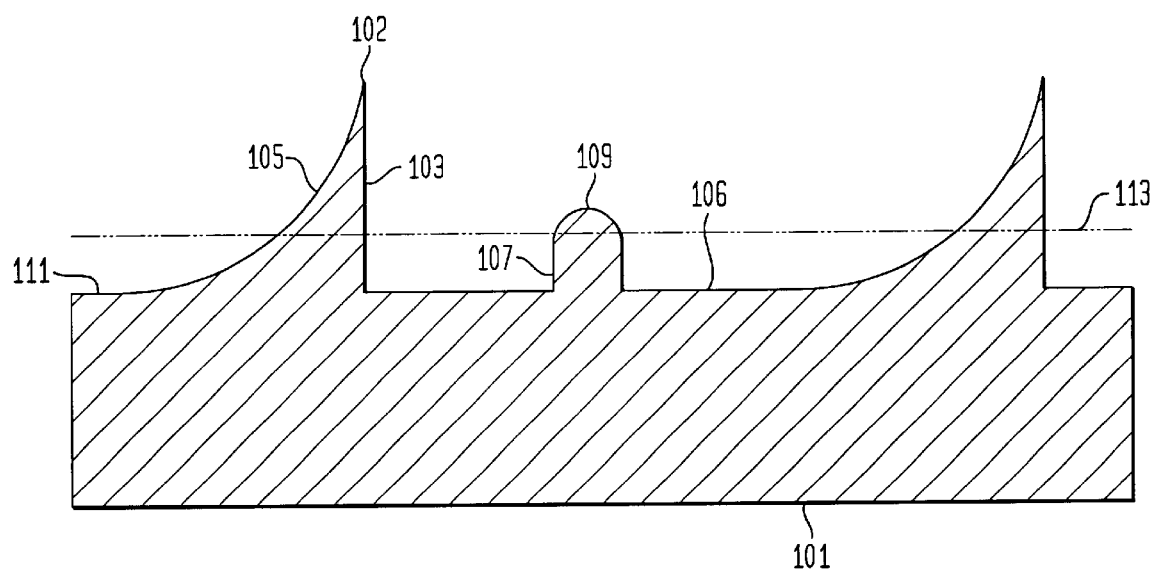
FIG. 1 shows an idealized close up cross section of the masonry anchor according to this invention.

This invention is an improvement on that for the masonry anchor described in U.S. Pat. No. 5,957,646, the disclosure of which is incorporated herein by reference. Referring now to FIG. 1, shown is a closeup idealized cross section of a self-tapping screw-type anchor in accordance with the invention. The body 101 or shank of the anchor is fabricated of heat-treated, hardened steel or other high-strength, corrosion-resistant metal. The masonry anchors disclosed herein are all of the bolt type having an enlarged head. In practice, however, the anchor may be of the stud type in which the upper end of the anchor is externally threaded and extends through the mounting hole of the fixture to be fastened, a nut turned on the upper end of the stud being tightened against the surface of the fixture.

The crest diameter of the convolutions of the cutting thread 102 is greater than the diameter of drilled hole 113. Hence when the anchor is screwed into the hole, the threads cut and tap the bank of the hole to form a corresponding female thread therein. The intermeshing male and female threads mechanically retain the anchor in the masonry hole and offer high resistance to axial pull-out forces. As shown, the trailing face 103 is essentially normal to the shank. The leading face 105 has a curved or arcuate (but not elliptical), preferably radial shape, and thus provides a supported surface enabling the trailing face to resist pull out forces. There may be one or two (i.e., single or double helix) threads, which may have the same or different crest diameters so long as they are greater than the diameter of the hole. The hole has a predetermined diameter. Between successive convolutions of the thread is a space 106 which may be a land, so long as its diameter is less than that of the hole. In the space between the threads is a ridge 107 having a curved, preferably hemispherical crest 109. The ridge has a diameter greater than that of the hole. The diameter of the root 111 may essentially equal to and is preferably less than that of the hole 113.

When the anchor is turned into the masonry hole, the male cutting threads cut into and tap the bank of the hole. Because the material which forms the masonry is friable, this cutting action produces a particulate debris which is discharged onto the land between successive convolutions of the thread(s). Perhaps more importantly, the flat trailing face 103 of the thread(s) which faces the user provides improved pull out resistance: the pull out forces are normal to the trailing face, so the face takes all of the force; and the leading face (which is the trailing face in the case of a pull out) is arcuate, helping to disperse the pull out forces and helping to support the tip of the cutting thread thereagainst.

Because the ridge diameter is greater than the hole into which the anchor is turned, the ridge cuts or abrades into the bank of the hole. Not having a sharp point, the ridge cuts into the bank with a higher frictional force and abrades possibly more of the bank material than the cutting thread does with its sharp edge. The abraded material gathers in the open space (106) and compacts therein. The lack of a sharp cutting point on the ridge results in a high frictional force between the ridge and the masonry, and this force extends along the entire helical portion of the ridge in the bore (because the bolt is right rectangular and not tapered as a wood screw would be). Thus, while the aforementioned Giannuzzi bolt provides lands on and grooves below the root diameter of the bolt to form a compacting zone, the present invention provides between convolutions of the cutting thread(s) a ridge having a diameter larger than the root and larger than the bore diameter into which the bolt is screwed. Thus, the ridge grinds into the bank and is wedged there. While the preferred embodiment has the ridge diameter just greater than the bore diameter, adding about 5 to 10 ft-lb$_f$ torque to the forces required to unscrew the bolt, it can be seen that the portion of the diameter of the ridge greater than the bore diameter can be increased, thus increasing the torque required to unscrew the bolt from the bore. The wedging action produced by hemispherical ridge of the anchor and the bank of the masonry hole makes the anchor highly resistant to back-out torque forces and so it is not subject to loosening of the anchor as a result of shock and vibratory forces to which the installation is exposed.

The anchor can have one cutting thread, two cutting threads whose leads are 180 degrees apart, and in practice a multiple-lead thread anchor may have three helical cutting threads with the leads thereof displaced 120 degrees from each other, or it may have a greater number of multiple threads depending on the masonry into which the anchor is to be installed.

In terms of mechanical engineering and mechanical advantage, a screw is an inclined plane wrapped around a cylinder so that the height of the plane is parallel to the axis of the cylinder. The mechanical advantage of a screw-type masonry anchor is the ratio of the force produced by the anchor when it enters a hole drilled in masonry to cut and tap the bank of the hole to the force applied to the anchor to effect this action. For a screw-type masonry anchor having a helical cutting thread, a torque force must be applied to the anchor in order to have the anchor turn into the masonry hole. Hence the higher the mechanical advantage of the screw-type anchor, the less is the required torque force to turn the anchor into the drilled masonry hole.

The pitch of the anchor cutting thread determines the extent to which the anchor advances axially into the drilled hole for each revolution of the anchor. If therefore the pitch of the thread is such as to create a large number of convolutions along the length of the anchor shank, it will take an equal number of turns of the anchor to advance it fully into the drilled masonry hole. Hence in this instance, the installation time will be relatively long. The pitch of a screw is determined by the slope or helix angle of the thread, the greater the angle, the greater the distance between successive convolutions. The advantage of a screw-type masonry anchor having a single male helical cutting thread whose pitch angle is such that the anchor has a large number of convolutions along its length, is that this anchor cuts into the bank of the drilled hole a correspondingly large number of female convolutions, thereby providing a high resistance to axial pull-out forces. This pull-out resistance which determines the holding power of the anchor is further enhanced by the ridge that frictionally engages the bank.

Figure 2:
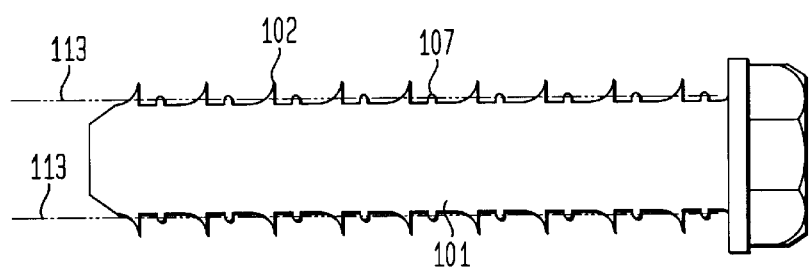
FIG. 2 shows an idealized side view of a masonry anchor according to this invention.

Another advantage of the present invention is that the cutting threads have a cross section that is a hybrid between a right triangle and an isosceles triangle with curved faces. As shown in FIG. 2, the leading face is arcuate and the trailing face is flat and oriented essentially normal to the axis of the shaft of the masonry bolt. When the bolt is inserted into masonry and then pulled back, the flat surface resists pull out forces better than a face angled obliquely to the shaft of the bolt. Additionally, the pull out forces are borne by the arcuate, leading face, which distributes those forces over that face much as an arcuate supports a structure supported on an arch.

While the foregoing description is directed to masonry bolts turned into masonry having a depth greater than the bolt length, it is often required that the bolt be turned into a thin-walled structure such as a cinder block. As mentioned above, a hole is drilled into the masonry having a diameter just larger than the bolt, and the bolt is then turned into the masonry. When drilling into the thin wall of a cinder block, the rear wall typically experiences a break out which reduces even further the length of the bore into which the bolt is turned. To compensate for the reduced amount of material to hold the bolt an anchor is useful, but anchors similarly require material along their length to facilitate their holding action.

This invention provides as a novel anchor a cylindrical sleeve made of a durable, deformable material such as high density polyethylene (HPDE). The sleeve can also be made of a soft metal such as zinc (e.g., SAMAK 7 alloy). The outer diameter of the anchor should be the same size as the diameter of the bore drilled into the cinder block (e.g., if a ½ inch hole is drilled, the O.D. of the sleeve is ½ inch). The inner diameter of the sleeve should be the same diameter as the root of the bolt (e.g., 7/16" I.D. for a 7/16" diameter bolt root). The sleeve can have openings but is preferably solid. After the hole is drilled, the sleeve is inserted, and fixture to be attached is positioned, and then the bolt is turned into the hole.

Figure 3:
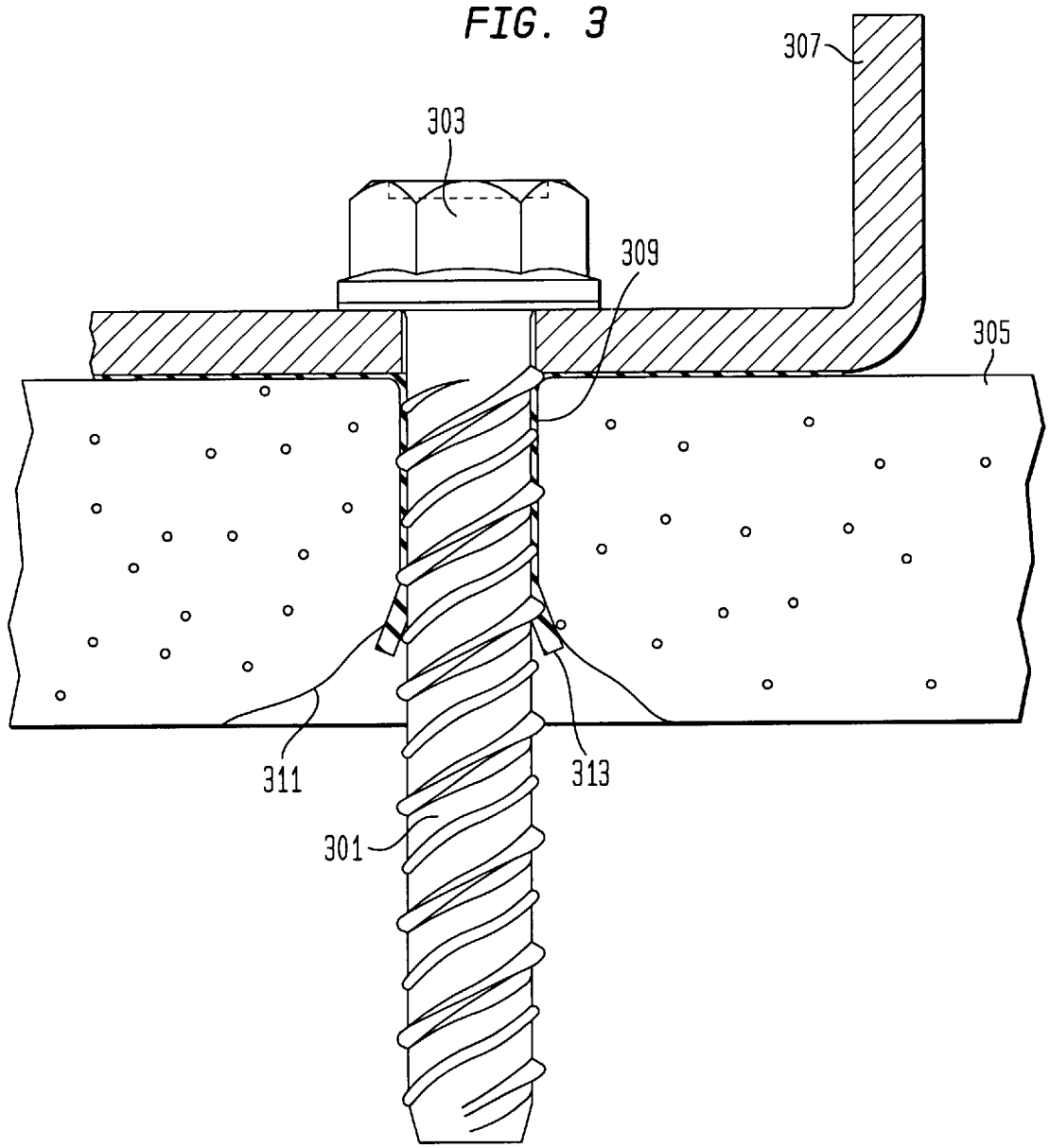
FIG. 3 shows an idealized breakaway view of a masonry bolt inserted into a thin-walled masonry block using the sleeve anchor of this invention.

As shown in FIG. 3, a bolt 301 having a head 303 for driving the bolt (e.g., hexagonal is inserted into a masonry block 305 and holds a fixture 307 to the block (the fixture typically has a bore through which the bolt is driven). A bore 309 has been drilled into the masonry block and, as noted above, the rear portion of the bore typically experiences an area 311 of broken-away material. The sleeve 313 is positioned in the bore and wedged thereinto. The bolt shown is the same as the bolt shown and described in the aforementioned patent to Giannuzzi, U.S. Pat. No. 5,957,646.

Figure 4:
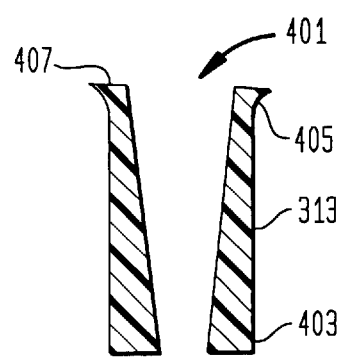
FIG. 4 is an idealized cross section of the novel sleeve anchor of this invention.

FIG. 4 depicts an idealized cross section of the sleeve 313, which has a bore 401 extending from an insertion end 403 to a trailing end 405. In a preferred embodiment, disposed at the trailing end 405 is a lip or flange 407 which helps to keep the sleeve positioned at the edge of the bore and prevents its slipping into the bore. Also preferably, the bore is taped from a smaller diameter at the leading end to a larger diameter at the trailing end. When the bolt is driven into the sleeve, the thicker portion at the leading end of the sleeve is wedged into the bore, thereby helping to hold the bolt in the shortened bore of a thin-walled masonry article.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A screw-type self-tapping masonry bolt for fastening an attachment to friable masonry having a hole drilled therein to receive an anchor, the hole having a predetermined diameter, the anchor comprising:

a shank having a root section whose diameter is smaller than that of said hole and said shank being integral with a head adapted to be engaged by a torque-producing tool;

at least one helical male cutting thread surrounding the root and having a crest diameter exceeding that of said hole whereby when the head is engaged by the tool and bolt is screwed into the hole the male cutting thread then cuts a female thread into the bank of said hole to mechanically retain the bolt and resist pull-out forces to impart holding strength to the bolt, the convolutions of said cutting thread having a helical land or space therebetween, said land or space having a diameter less than the predetermined diameter of said hold; and a hemispherical ridge formed in the helical land or space and having a diameter greater than that of the predetermined diameter of said hole and less than that of the crest diameter of said thread effective to wedge into the bank of the hole.

2. The bolt of claim 1, wherein said cutting thread has an arcuate leading face.

3. The bolt of claim 1, wherein said cutting thread has a flat trailing face disposed essentially normal to the axis of said shank.

4. The bolt of claim 1, comprises one helical male cutting thread.

5. The bolt of claim 4, comprising two helical male cutting threads.

6. The bolt of claim 2, wherein the leading face is radial.

7. A screw-type self-tapping masonry bolt for fastening an attachment to friable masonry having a hole drilled therein to receive an anchor, the hole having a predetermined diameter, the anchor comprising:

a shank having a root section whose diameter is smaller than that of said hole and said shank being integral with a head adapted to be engaged by a torque-producing tool;

at least one helical male cutting thread surrounding the root and having a crest diameter exceeding that of said hole whereby when the head is engaged by the tool and bolt is screwed into the hole the male cutting thread then cuts a female thread into the bank of said hole to mechanically retain the bolt and resist pull-out forces to impart holding strength to the bolt, the convolutions of said cutting thread having a helical land or space therebetween, said land or space having a diameter less than the predetermined diameter of said hold said cutting thread having a leading face that is arcuate and a trailing face that is flat and disposed essentially normal to the axis of said shank; and a ridge formed in the helical land or space and having a diameter greater than that of the predetermined diameter of said hole and less than that of the crest diameter of said thread effective to wedge into the bank of the hole.

8. The bolt of claim 7, wherein the ridge has a hemispherical crest portion.

9. The bolt of claim 7, wherein the leading face is radial.

* * * * *